United States Patent
Xia et al.

(10) Patent No.: US 11,510,190 B2
(45) Date of Patent: *Nov. 22, 2022

(54) SYSTEM AND METHOD FOR DELAY SCHEDULING

(71) Applicant: Futurewei Technologies, Inc., Plano, TX (US)

(72) Inventors: Jinhuan Xia, Beijing (CN); Brian Classon, Beijing (CN); Vipul Desai, Palatine, IL (US)

(73) Assignee: FUTUREWEI TECHNOLOGIES, INC, Plano, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/891,968

(22) Filed: Jun. 3, 2020

(65) Prior Publication Data

US 2020/0296705 A1    Sep. 17, 2020

Related U.S. Application Data

(63) Continuation of application No. 16/277,894, filed on Feb. 15, 2019, now Pat. No. 10,687,325, which is a
(Continued)

(51) Int. Cl.
*H04W 72/04* (2009.01)
*H04W 72/12* (2009.01)
*H04W 88/02* (2009.01)

(52) U.S. Cl.
CPC ......... *H04W 72/042* (2013.01); *H04W 72/12* (2013.01); *H04W 72/1273* (2013.01);
(Continued)

(58) Field of Classification Search
CPC .......... H04W 72/0406; H04W 72/042; H04W 72/1273; H04W 72/1289; H04W 72/0446; H04W 88/02
See application file for complete search history.

(56) References Cited

U.S. PATENT DOCUMENTS

| 9,119,197 B2 | 8/2015 | Xia et al. |
| 2006/0120408 A1 | 6/2006 | Willenegger |

(Continued)

FOREIGN PATENT DOCUMENTS

| CN | 101594205 A | 12/2009 |
| CN | 102158976 A | 8/2011 |

(Continued)

OTHER PUBLICATIONS

3GPP TS 36.211; 3rd Generation Partnership Project; Technical Specification Group Radio Access Network; Evolved Universal Terrestrial Radio Access (E-UTRA); Physical Channels and Modulation (Release 10), Dec. 2011, 101 pages, V10.4.0.
(Continued)

*Primary Examiner* — Chi Ho A Lee
(74) *Attorney, Agent, or Firm* — Slater Matsil, LLP

(57) ABSTRACT

A method includes determining a first subframe on which to transmit a first downlink control information (DCI) message and determining a second subframe on which to transmit a first information. The method also includes determining a delay between the first subframe and the second subframe and transmitting, by a communications controller to a user equipment (UE), the second subframe in accordance with the delay.

24 Claims, 4 Drawing Sheets

Related U.S. Application Data continuation of application No. 15/278,318, filed on Sep. 28, 2016, now Pat. No. 10,219,262, which is a continuation of application No. 14/819,058, filed on Aug. 5, 2015, now Pat. No. 9,468,017, which is a continuation of application No. 13/899,251, filed on May 21, 2013, now Pat. No. 9,119,197.

(60) Provisional application No. 61/650,339, filed on May 22, 2012.

(52) U.S. Cl.
CPC .... *H04W 72/1289* (2013.01); *H04W 72/0446* (2013.01); *H04W 88/02* (2013.01)

(56) References Cited

U.S. PATENT DOCUMENTS

| | | |
|---|---|---|
| 2010/0238823 A1 | 9/2010 | Chen et al. |
| 2011/0199944 A1 | 8/2011 | Chen et al. |
| 2011/0243102 A1 | 10/2011 | Sebire et al. |
| 2012/0051283 A1 | 3/2012 | Takahashi et al. |
| 2013/0039254 A1 | 2/2013 | Kim et al. |
| 2013/0176952 A1 | 7/2013 | Shin et al. |
| 2013/0242882 A1 | 9/2013 | Blankenship et al. |
| 2013/0286928 A1 | 10/2013 | Xu et al. |
| 2013/0308572 A1 | 11/2013 | Sayana et al. |
| 2013/0343362 A1 | 12/2013 | Huang et al. |
| 2014/0050192 A1 | 2/2014 | Kim et al. |
| 2014/0119248 A1 | 5/2014 | Park |
| 2014/0219202 A1 | 8/2014 | Kim et al. |
| 2014/0233518 A1 | 8/2014 | Lee et al. |
| 2014/0269594 A1 | 9/2014 | Jang et al. |
| 2014/0301336 A1 | 10/2014 | Kim et al. |
| 2014/0321406 A1 | 10/2014 | Marinier et al. |
| 2015/0016419 A1 | 1/2015 | Kim et al. |
| 2015/0031369 A1 | 1/2015 | Gunnarsson et al. |
| 2015/0085778 A1 | 3/2015 | Morioka |
| 2016/0241376 A1 | 8/2016 | Gauvreau et al. |
| 2018/0234956 A1* | 8/2018 | Seo .................... H04L 5/1469 |

FOREIGN PATENT DOCUMENTS

| | | |
|---|---|---|
| CN | 102204386 A | 9/2011 |
| CN | 102273307 A | 12/2011 |
| CN | 103002477 A | 3/2013 |
| CN | 104322129 A | 1/2015 |
| WO | 2009104085 A2 | 8/2009 |
| WO | 2010045428 A1 | 4/2010 |
| WO | 2010051209 A1 | 5/2010 |
| WO | 2012087000 A2 | 6/2012 |
| WO | 2013175181 A1 | 11/2013 |

OTHER PUBLICATIONS

3GPP TS 36.212; 3rd Generation Partnership Project; Technical Specification Group Radio Access Network; Evolved Universal Terrestrial Radio Access (E-UTRA); Multiplexing and channel coding (Release 10), Mar. 2012, 79 pages, V10.5.0.

3GPP TS 36.213; 3rd Generation Partnership Project; Technical Specification Group Radio Access Network; Evolved Universal Terrestrial Radio Access (E-UTRA); Physical layer procedures (Release 10), Mar. 2012, 125 pages, V10.5.0.

3GPP TS 36.300; 3rd Generation Partnership Project; Technical Specification Group Radio Access Network; Evolved Universal Terrestrial Radio Access (E-UTRA) and Evolved Universal Terrestrial Radio Access Network (E-UTRAN) Overall description; Stage 2 (Release 11), Mar. 2012, 194 pages, V11.1.0.

3GPP TS 36.306; 3rd Generation Partnership Project; Technical Specification Group Radio Access Network; Evolved Universal Terrestrial Radio Access (E-UTRA); User Equipment (UE) radio access capabilities (Release 10), Mar. 2012, 22 pages, V10.5.0.

3GPP TS 36.321; 3rd Generation Partnership Project; Technical Specification Group Radio Access Network; Evolved Universal Terrestrial Radio Access (E-UTRA); Medium Access Control (MAC) protocol specification (Release 10), Mar. 2012, 54 pages, V10.5.0.

3GPP TS 36.331; 3rd Generation Partnership Project; Technical Specification Group Radio Access Network; Evolved Universal Terrestrial Radio Access (E-UTRA); Radio Resource Control (RRC);Protocol specification (Release 10), Mar. 2012, 302 pages, V10.5.0.

\* cited by examiner

SYSTEM AND METHOD FOR DELAY SCHEDULING

CROSS-REFERENCE TO RELATED APPLICATIONS

This application is a continuation of U.S. patent application Ser. No. 16/277,894, filed Feb. 15, 2019 entitled "System and Method for Delay Scheduling," which is a continuation of U.S. patent application Ser. No. 15/278,318, filed Sep. 28, 2016 (issued with U.S. Pat. No. 10,219,262) entitled "System and Method for Delay Scheduling," which is a continuation of U.S. patent application Ser. No. 14/819,058, filed Aug. 5, 2015 (issued with U.S. Pat. No. 9,468,017), entitled "System and Method for Delay Scheduling," which is a continuation of U.S. patent application Ser. No. 13/899,251, filed May 21, 2013 (issued with U.S. Pat. No. 9,119,197), entitled "System and Method for Delay Scheduling," which claims the benefit of U.S. Provisional Application Ser. No. 61/650,339 filed on May 22, 2012, and entitled "System and Method for Delay Scheduling," which applications are hereby incorporated herein by reference.

TECHNICAL FIELD

The present invention relates to a system and method for wireless communications, and, in particular, to a system and method for delay scheduling.

BACKGROUND

In the Third Generation Partnership Project (3GPP) Long Term Evolution (LTE) Release-10 technical standards, transmissions from a communications controller to user equipments (UEs) include both data channels and control channels. LTE is a standard for wireless communication of high speed data for mobile phones and data terminals. Compared to Global System for Mobile Communications (GSM) Enhanced Data Rates for GSM Evolution (EDGE) and Universal Mobile Telecommunications System (UMTS) High Speed Packet Access (HSPA) network technologies, LTE increases the capacity and speed of a network by using a different radio interface along with core network improvements.

In LTE Release-10, the carrier bandwidth is one of six possible values (1.4 MHz, 3 MHz, 5 MHz, 10 MHz, 15 MHz, and 20 MHz). The frequency dimension contains subcarriers that may be 15 kHz apart. The time dimension of the system uses symbols, slots, subframes, and frames. In an example, the slots are 0.5 ms in duration. The subframes may contain two slots and be 1 ms in duration, while the frames may contain ten subframes and be 10 ms in duration. There are seven symbols in a slot when a normal cyclic prefix (CP) is used. When an extended CP is used, there are six symbols per slot. The subframes are numbered from 0 to 9.

SUMMARY

An embodiment method includes determining a first subframe on which to transmit a first downlink control information (DCI) message and determining a second subframe on which to transmit a first information. The method also includes determining a delay between the first subframe and the second subframe and transmitting, by a communications controller to a user equipment (UE), the second subframe in accordance with the delay.

An embodiment method includes receiving, by a user equipment (UE) from a communications controller, symbols of a first subframe including a downlink control information (DCI) message and receiving, by the UE from the communications controller, symbols of a second subframe in accordance with a delay, where the symbols of the second subframe include information. The method also includes obtaining the delay.

An embodiment communications controller includes a processor and a non-transitory computer readable storage medium storing programming for execution by the processor. The programming includes instructions to determine a first subframe on which to transmit a first downlink control information (DCI) message and determine a second subframe on which to transmit a first information. The programming also includes instructions to determine a delay between the first subframe and the second subframe, and transmit, to a user equipment (UE), the second subframe in accordance with the delay.

An embodiment user equipment (UE) includes a processor and a non-transitory computer readable storage medium storing programming for execution by the processor. The programming includes instructions to receive, from a communications controller, symbols of a first subframe including a downlink control information (DCI) message and receive, from the communications controller, symbols of a second subframe in accordance with a delay, where the symbols of the second subframe include information. The programming also includes instructions to obtain the delay.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
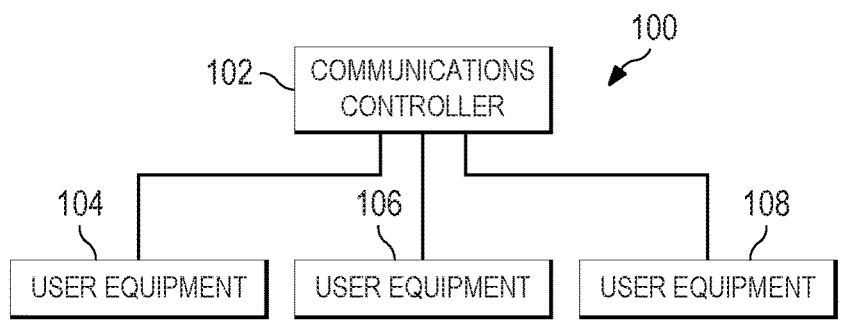
FIG. 1 illustrates an embodiment system for delay scheduling.

FIG. 1 illustrates system 100 for delay scheduling. System 100 includes communications controller 102, which may be referred to as an enhanced node B (eNB) or a base station. Coupled to communications controller 102 are user equipment (UE) 104, UE 106, and UE 108. In an example, UEs 104, 106, and 108 are mobile devices. Three UEs are pictured, but more or fewer UEs may be coupled to a single communications controller. One or more of UEs 104, 106, and 108 can be machine type communications (MTC) devices. The MTC device may be a wireless sensor, where the sensor takes some measurements. The sensor then conveys the information about the measurements using a wireless protocol. For instance, smart metering can be implemented using MTC technology. Other UEs are non-MTC devices, for example cell phones or other traditional devices.

MTC devices have a subset of features of non-MTC devices. For example, MTC devices may support a reduced bandwidth. In an example, a non-MTC device supports a bandwidth of up to 20 MHz, while an MTC device may support a bandwidth of 5 MHz or less. MTC devices are generally less expensive than non-MTC devices. One example of a less expensive MTC device may have a restricted payload size. Also, in another example, MTC devices may use only one receive antenna. In some applications, MTC devices are used in remote areas, such as basements, and need an additional 20 dB in link budget to have an equivalent coverage to that of non-MTC devices.

A system containing both MTC devices and non-MTC devices, such as system 100, provides compatibility to both MTC devices and non-MTC devices. For example, a physical downlink control channel (PDCCH) intended for non-MTC devices may be transmitted at the 20 MHz bandwidth. A physical control format indicator channel (PCFICH), which may also indicate the width of a control region, may be transmitted across the 20 MHz bandwidth. The width can be represented by a number of OFDM symbols. An MTC device operating at a lower bandwidth receives portions of the PDCCH and PCFICH, but not the entire PDCCH and PCFICH. When an MTC device cannot receive the entire PCFICH, it may not know the duration of the control region.

In LTE or enhanced LTE systems, resource scheduling is implemented in a transmission time interval (TTI). For example, the TTI may be transmitted with a 1 ms time interval. UE 104 initially receives the downlink control information (DCI) message in a physical downlink control channel (PDCCH). The DCI message may indicate the scheduling information for downlink data in a physical downlink shared channel (PDSCH) in the current subframe. For example, the DCI message includes resource allocation (RA), the modulation and coding scheme (MCS), and additional information. Also, the DCI message may indicate scheduling information for uplink data in the physical uplink shared channel (PUSCH) in a future subframe. In one example, the PDCCH spans the entire carrier bandwidth in the frequency domain, and occupies between one and four orthogonal frequency division multiplexing (OFDM) symbols in the time domain. When the carrier bandwidth is 3 MHz, 5 MHz, 10 MHz, 15 MHz, or 20 MHz, up to three OFDM symbols are used for the PDCCH. On the other hand, when a 1.4 MHz carrier bandwidth is used, the PDCCH is transmitted using between two and four OFDM symbols. A master information block (MIB) is transmitted on the center six resource block (RB) pairs. Then, subsequent access by UE 104 uses configuration information, such as the bandwidth, from the MIB. UE 104 may be scheduled to receive or transmit data on one or more physical resource block (PRB) pairs. In an example, the PRB pair occupies several OFDM symbols in the time domain and from twelve subcarriers to the entire bandwidth in the frequency domain. In one example, the number of symbols in a PRB pair is equal to the number of symbols in the data region. In an MTC device, a subset of the entire downlink PRB space may be examined in each subframe.

Figure 2:
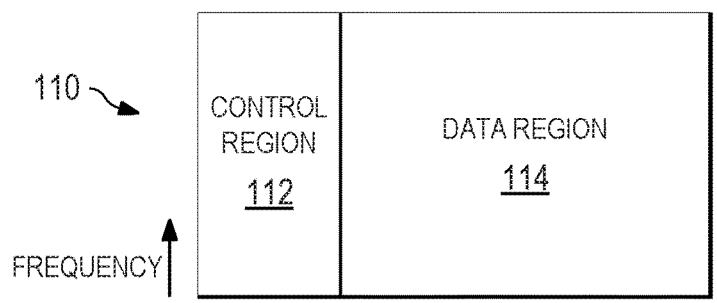
FIG. 2 illustrates a downlink subframe.

Symbols corresponding to a downlink subframe may be transmitted from communications controller 102 to UE 104. FIG. 2 illustrates downlink frame 110, which contains control region 112 and data region 114. The x axis illustrates the time domain, and the y axis illustrates the frequency domain. Control region 112 may contain a PDCCH, a physical control format indicator channel (PCFICH), a physical hybrid automatic request (HARQ) indicator channel (PHICH), and other signals, such as common reference symbols. In general control region 112 may contain zero, one, or more than one PDCCH. Control region 112 spans the entire bandwidth. Data region 114 may contain a PDSCH and other channels and signals. In general, data region 114 may contain zero, one, or more than one PDSCH.

An LTE system may use frequency division duplexing (FDD) or time division duplexing (TDD). TDD is an application of time-division multiplexing to separate uplink and downlink signals in time, possibly with a guard period situated in the time domain between the uplink and downlink signaling. In FDD, the uplink and downlink signals are at different carrier frequencies.

Figure 3:
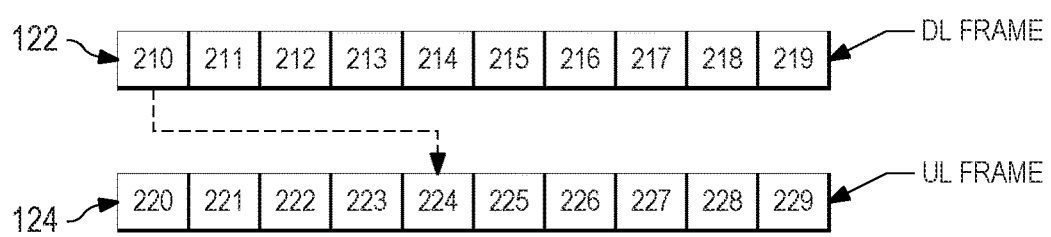
FIG. 3 illustrates subframe numbering for frequency division duplexing.

FIG. 3 illustrates downlink (DL) frame 122 and uplink (UL) frame 124 in an FDD system. Downlink frame 122 includes subframes 210-219, while uplink frame 124 contains subframes 220-229. The carrier frequency for downlink frame 122 is different from the carrier frequency for uplink frame 124. In an example, subframe 210 contains the PDCCH with scheduling information for the PDSCH in subframe 210. The PDCCH in subframe 210 also contains scheduling information for the physical uplink shared channel (PUSCH) in subframe 224. In FDD, the onset of subframe 21$x$ and subframe 22$x$ happen at the same time, where $x$ is an integer between 0 and 9.

Figure 4:
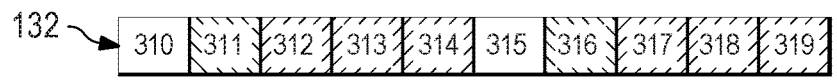
FIG. 4 illustrates subframe numbering for time division duplexing.

FIG. 4 illustrates frame 132 for use in a TDD system. In frame 132, subframes 310 and 315 are downlink subframes, while subframes 311 and 316 are special subframes. Special subframe contains a downlink pilot time slot (DwPTS), a guard period (GP), and an uplink pilot time slot (UpPTS). Subframes 312, 313, 314, 317, 318, and 319 are uplink subframes.

Delay scheduling may be used by the communication controller to receive or transmit information in later subframes. Delay scheduling facilitates the coexistence of MTC devices in a network that also supports non-MTC devices. In delay scheduling, delay values may be fixed or semi-statically changed. In one example, different delay values are used for different device types. For example, one delay value is used for MTC devices, while another delay value is used for non-MTC devices. For backwards compatibility, the delay value for certain non-MTC devices may be implicitly o. In another example, one MTC device has a first delay value while another MTC device has a second delay value. With different delay values, separate common messages are sent to the MTC devices and the non-MTC devices. When delay scheduling is used, the HARQ timing may be adjusted, and resources for a HARQ response are reserved. When half duplex FDD (HD-FDD) is used, fixed or semi-statically configurable uplink and downlink configurations may be defined as in TDD. Alternatively, an uplink or downlink transmission may be dropped depending on its priority when a conflict appears. Delay scheduling may enable MTC devices to operate with an additional 20 dB of margin. Also, delay scheduling may allow MTC devices with small bandwidths to switch frequency subcarriers to receive data with the benefit of frequency selective scheduling.

If a UE, such as an MTC device, can obtain scheduling information before buffering of downlink transmissions, the UE may buffer only the scheduled physical resources, not the entire bandwidth of data. The size of buffer may be reduced, reducing the cost of the MTC device. Also system performance may be improved by frequency selective scheduling.

Another control channel in LTE is the enhanced PDCCH (ePDCCH). Like the PDCCH, the ePDCCH carries both uplink grants and downlink assignments. However, unlike the PDCCH, the ePDCCH uses a UE specific demodulation reference signal (DMRS).

Figure 5:
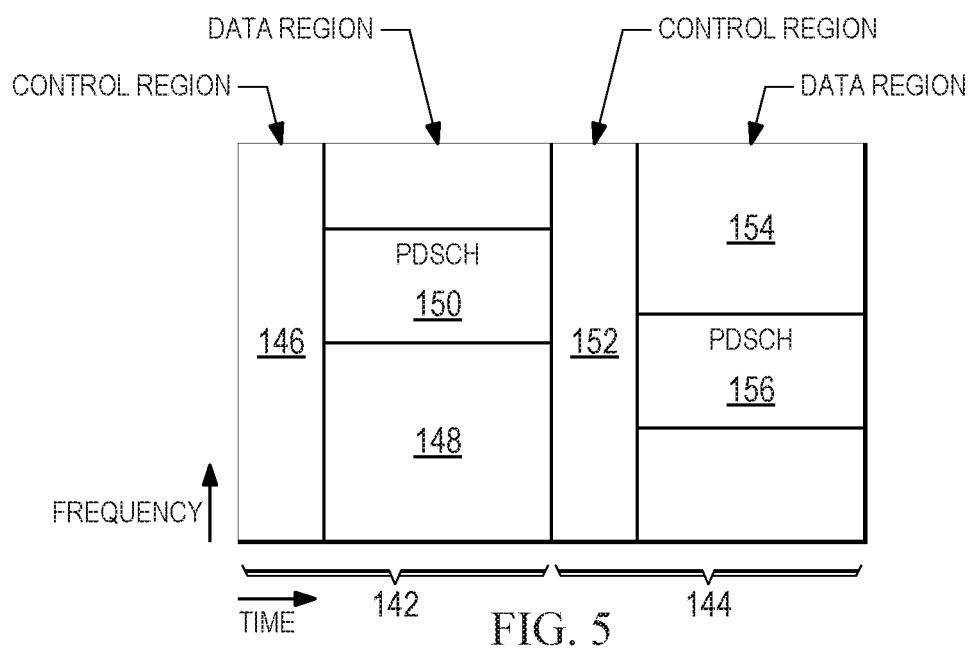
FIG. 5 illustrates two consecutive subframes.

The ePDCCH may have a user specific search space, which may include a set of enhanced CCEs (eCCEs), and may be defined in terms of eCCEs or RBs. The ePDCCH spans only a narrow band of frequency resources, but frequency multiplexes with the PDSCH. FIG. 5 illustrates an example for frequency allocation in an MTC device for two consecutive subframes, subframe 142 and subframe 144. Subframe 142 contains control region 146 and data region 148, which contains PDSCH 150. Control region 146 may contain a DCI message for non-MTC devices. Data region 148 may carry the ePDCCH for the MTC device in subframe 142. Similarly, subframe 144 contains control region 152 and data region 154, which contains PDSCH 156. Like data region 148, data region 154 may carry the ePDCCH for the MTC device in subframe 144. In an example, the ePDCCH in data region 148 and the ePDCCH in data region 154 occupy different PRB pairs. The ePDCCH may occupy all symbols of a subframe except for the control region. Because the ePDCCH occupies all symbols of data region 148, it is desirable for devices to have the ability to decode the DCI message in the ePDCCH very quickly or use delay scheduling to determine when the PDSCH associated with the ePDCCH can be received. Because the UE processes the ePDCCH first, it must receive the symbols of the data region for that subframe initially.

There are potential issues using the ePDCCH. With non-MTC devices, once a DCI containing scheduling information for a PDSCH is identified, the non-MTC device can then process the resources associated with that PDSCH, because the symbols or subcarriers bearing those resources were stored in a buffer. The buffer enables non-MTC devices to process PRBs carrying the associated PDSCH in the same subframe as the ePDCCH. Processing both the ePDCCH and the associated PDSCH of the same subframe implies that the size of the buffer is large. An MTC device may process the ePDCCH and associated PDSCH in the same subframe if certain conditions hold. Such conditions include the size of the resources corresponding to the number of PRB pairs for the ePDCCH, the associated PDSCH, and that the gap between the ePDCCH and PDSCH is not greater than the size of the buffer. Also, the ePDCCH and associated PDSCH should occupy the PRB pairs that are within the bandwidth of the MTC device. However, to ensure that MTC devices are not expensive, the size of the buffer should be as small as possible. For an MTC device, a communications controller might follow these exemplary conditions. There is no guarantee that the communications controller can satisfy these conditions while meeting the LTE requirements for other UEs in the system. An alternate approach for scheduling for ePDCCH and the associated PDSCH is needed for MTC devices.

Due to location of the ePDCCH in subframe k, a UE may store symbols of the next subframe (k+1) as it is processing ePDCCH. For an MTC device that processes a subset of the PRB pairs of the possible PRB pairs in the system in each subframe, the MTC device may not know beforehand which subset of PRB pairs to store in subframe (k+1) until it finished processing the ePDCCH in subframe k. Furthermore, a communications controller may be unable to transmit the PDSCH in subframe k+1 using the same bandwidth as the ePDCCH in subframe k. For example, in an overall 20 MHz downlink transmission, an MTC device may be able to use only 1.4 MHz (6 PRB pairs such as PRB pairs 6 to 11). In subframe k, the ePDCCH may be transmitted using some PRB pairs between PRB pairs 6 and 11, while the associated PDSCH in subframe k+1 is located in a region of PRB pairs 12-17. The MTC device may be unable to change the frequency band corresponding to the different set of PRB pairs for what it capturing without additional delay.

Another benefit to using the ePDCCH is power savings. With delay scheduling, the MTC device can skip processing future subframes if there is no scheduled PDSCH. Furthermore, if there are rules, such as that the ePDCCH and PDSCH cannot be transmitted in the same subframe to a given MTC device, further power savings may be achieved.

In an embodiment, the ePDCCH and the scheduled PDSCH are in different subframes. When delay scheduling is used, an MTC device buffers only the scheduled data, not the entire bandwidth of data. Thus, the MTC device may be implemented at a lower cost compared to a non-MTC device due to a reduced buffer size or relaxed operation speed.

Figure 6:
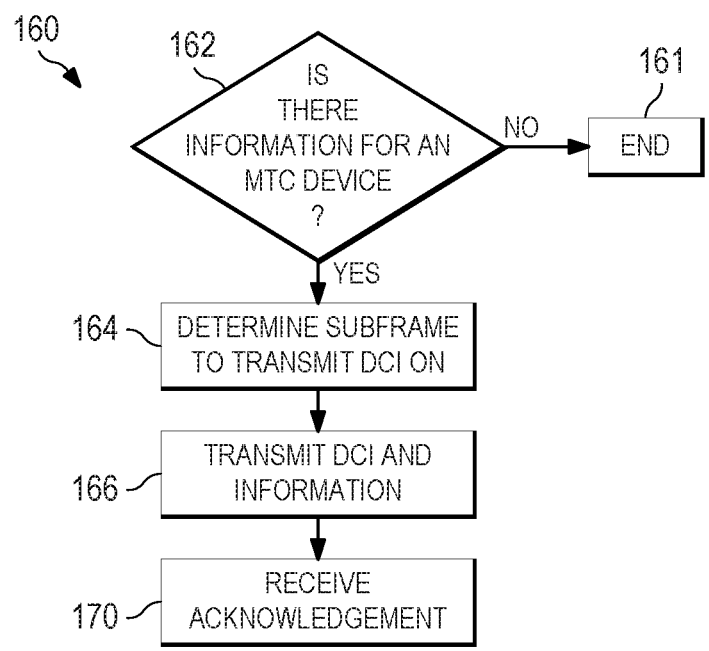
FIG. 6 illustrates an embodiment method of delay scheduling.

FIG. 6 illustrates flowchart 160 for a method of delay scheduling. This method is performed by communications controller 102. Initially, in step 162, communications controller 102 determines whether it has information for an MTC device. The information may be data information, control information, or both. This information may be transmitted on the PDSCH. When communications controller 102 does not have information for an MTC device, the method ends in step 161.

When there is information for an MTC device, communications controller 102 proceeds to step 164, where it determines on which subframe to transmit the DCI message. Communications controller 102 decides whether to transmit the DCI message on the PDCCH or ePDCCH. The decision may be based on the capabilities of the device. Also, communications controller 102 decides on which resources to place the DCI message. When the PDCCH is used, the resources may be control channel elements (CCEs) and the aggregation level. On the other hand, when the ePDCCH is used, the resources used may be the aggregation level, eCCEs, and one or more PRB pairs. Additionally, communications controller 102 decides what type of DCI message to transmit, and on which PRB pair(s) to transmit the PDSCH. In one example, the DCI message contains a field or offset for which later subframe or subframes contain the downlink data or are granted for uplink transmission.

After determining on which subframe to transmit the DCI message, communications control 102 transmits the subframe (i.e., the OFDM symbols of the subframe) with the DCI message to UE 104. Information, such as the PDSCH, is also transmitted to UE 104 in a separate subframe in step 166.

Finally, in step 170, communications controller 102 receives an acknowledgement associated with the transmission of information (e.g., PDSCH) to UE 104. An acknowledgement in step 170 can represent a positive acknowledgement (ACK), implying that the reception of information was correct, or a negative acknowledgment (NACK), implying that the reception of information was incorrect. Assuming that the PDSCH is sent in the kth subframe, for an FDD system, communications controller 102 receives the acknowledgement in the (k+4)th subframe. On the other hand, in a TDD system, communications controller 102 receives the acknowledgement, for example in the first uplink subframe that is in or after the (k+4)th subframe. In LTE Release-10, the resources for the acknowledgement are based on the index of the CCE for DCIs send on the PDCCH, and the transmission of the acknowledgement by an UE is based on the reception of the PDCCH. When it is sent on the ePDCCH, a procedure based on configuration parameters for the ePDCCH is used to determine the resources for the acknowledgement. With delay scheduling, the transmission of the acknowledgement can be based on when the subframe containing the PDSCH was received. The transmission of the acknowledgement may also be based on when the PDCCH/ePDCCH was received and the delay value.

Figure 7:
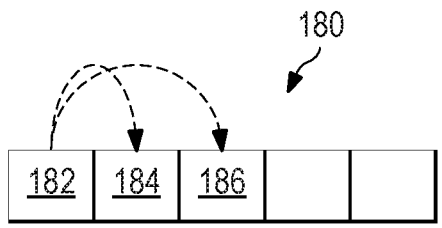
FIG. 7 illustrates the use of an offset value in a downlink control information (DCI) message.

FIG. 7 illustrates frame 180, which may be used for delay scheduling. Frame 180 contains consecutive subframes 182, 184, and 186. The DCI in subframe 182 may convey a bit field, for example three bits, that indicates which subframes are scheduled for downlink transmission. The bit field could be an index of a table of delay values. The bit field can also represent the delay value directly. For example, if the DCI is transmitted on subframe 182, the kth subframe, a delay value of 0 indicates that the scheduled PDSCH is in the kth subframe. However, a delay value of 1 indicates that the PDSCH is transmitted in the (k+1)th subframe (subframe 184), and a delay value of 2 indicates that the PDSCH is transmitted in the (k+2)th subframe (subframe 186). For MTC devices, when the DCI is transmitted in the PDCCH in subframe 182, the delay value of 0 may be disallowed, because subframe 182 cannot be used for its PDSCH for that MTC device. When the DCI is transmitted in the ePDCCH of subframe 182 for an MTC device, the values of 0 and 1 are disallowed, because, for that MTC device, its PDSCH cannot be transmitted on subframes 182 and 184.

For MTC devices, one reason for the delay value restrictions for the PDCCH and the associated PDSCH can be buffer size limitations. In subframe k, the MTC device can receive the symbols corresponding to the control region. The MTC device can then process both the common search space and UE specific search space of the PDCCH to find a DCI directed towards the MTC device. With delay scheduling, the MTC device can determine which data regions to capture in a future subframe. In subframe k, the MTC device stores all the resource elements of the symbols for the control region. Unless the width of the control region is known beforehand (e.g. via higher layer signaling or through a standards specifications), the MTC device may have to store symbols based on the maximum size of the control region. In one instance, for a 20 MHz system, there are 1200 resource elements per symbol, and a maximum size of the control region is 3 symbols. The MTC device may have to store 3×1200=3600 resource elements. If the communications controller indicates, with delay scheduling, that the PDSCH associated with the PDCCH is in subframe k+1, and the number of PRBs pairs used that PDSCH is 6 (corresponding to 1.4 MHz), the MTC device may store 72 resources/symbol×14 symbols=1008 resource elements of subframe k+1. Without delay scheduling, a device may store 1200 resource elements per symbol×14 symbols/per subframe=16,800 resource elements. Since the PDCCH is located in the first few symbols of subframe k, the MTC device can finish processing the PDCCH in subframe k and still prepare for capturing a narrowband PDSCH in subframe k+1.

Figure 8:
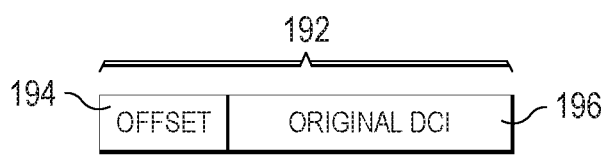
FIG. 8 illustrates the use of an offset value in a DCI message.

FIG. 8 illustrates an example of a DCI offset, which can be the label of the bit field in FIG. 7. DCI message 192 contains offset 194 and original DCI 196. Offset 194 is placed in original DCI 196, for example by prepending. Alternatively, offset 194 is placed at the end of original DCI 196. The offset for PDSCH transmission for MTC devices may be a subset of a range when the same DCI format is also used for non-MTC devices. Also, when the DCI message is in subframe k, there may be indicators or mappings indicating the width of the control region of subframe k+d, where d is determined by DCI offset 194 in DCI message 192. Alternatively, there may be indicators, mappings, and/or higher layer signaling to indicate the starting symbol of the associated PDSCH in subframe k+d.

Figure 9:
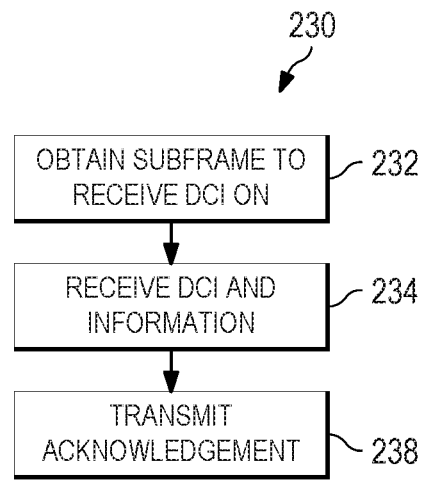
FIG. 9 illustrates another embodiment method of delay scheduling.

FIG. 9 illustrates flowchart 230 for a method of delay scheduling performed by UE 104. In one example, UE 104 is an MTC device. In another example, UE 104 is a non-MTC device. Initially, in step 232, UE 104 examines on which subframe it will receive a DCI message. UE 104 may search for a DCI on every subframe, in which case step 232 is bypassed. During discontinuous reception (DRX), UE 104 examines certain subframes. For MTC devices, there may be configurable periods where the device looks for the DCI. When UE 104 only receives the DCI message on the ePDCCH, UE 104 determines which PRB pair contains the ePDCCH.

Then, in step 234, UE 104 receives the symbols of the subframe containing the DCI message from communications controller 102. This is done, for example, by searching the appropriate search spaces of the PDCCH or ePDCCH for the locations of the PDCCH or ePDCCH carrying the modulated DCI. Upon finding the DCI message, UE 104 processes the DCI message to determine its contents. UE 104 also receives information from communications controller 102, for example in the same subframe or a subsequent or future subframe. The information conveyed in the PDSCH may be data information, control information (such as higher layer signaling), or both. UE 104 receives the PDSCH based on the processed DCI message. The delay value for receiving the PDSCH may be based on the contents of the DCI message, the broadcast information, or specification rules. Rules in the specification may indicate the timing between the DCI message and the associated PDSCH. Also, UE 104 may obtain a delay value, for example from broadcast information, such as a physical broadcast channel PBCH or an enhanced PBCH (ePBCH). In another example, UE 104 obtains a delay value by receiving the delay value in a high layer radio resource control (RRC) signal, such as the system information (SI). In an additional example, UE 104 knows the delay value.

Then, in step 238, UE 104 transmits an acknowledgement message to communications controller 102. In an example, communications controller 102 reserves a physical uplink control channel (PUCCH) for acknowledgment from UE 104 to avoid PUCCH resource conflicts between MTC devices and non-MTC devices.

In an embodiment, UE 104 operates in HD-FDD mode. In HD-FDD mode, the acknowledgement is transmitted by UE 104 after a fixed delay from receiving the PDSCH. For example, UE 104 transmits the PUSCH in the (n+4)th subframe after detecting the uplink grant in the nth subframe. To simplify the scheduler for communications controller 102, when a conflict between uplink and downlink transmission appears, either the uplink or downlink transmission is dropped. For example the transmission with the lower priority is dropped.

In one example, delay scheduling is used for MTC devices, but not for non-MTC devices. For example, non-MTC devices may be scheduled by another method, such as using a PDCCH or ePDCCH to schedule the PDSCH in the current subframe. Alternatively, delay scheduling is used for both MTC devices and non-MTC devices. When delay scheduling is only used for MTC devices, the delay may be a fixed value d. Communications controller 102 transmits the PDCCH or ePDCCH in the nth subframe to schedule the PDSCH in the (n+d)th subframe. For example, d may be 2, 3, or another value. In one embodiment, the value of d is written into the specification. Both communications controller 102 and UE 104 know the value of d. A benefit of an embodiment is how delay scheduling may facilitate an extra 20 dB of coverage for MTC devices. In one example, more than one subframe, for example 200 subframes, may be used to transmit the same DCI to a particular MTC device. After decoding the DCI, the MTC device may begin receiving the PDSCH, possibly in multiple subframes after obtaining the delay value.

In another example where delay scheduling is used only for MTC devices, the delay value is transmitted in the physical broadcast channel (PBCH) or enhanced PBCH (ePBCH). In this example, communications controller 102 or another part of the network sets the delay value. UE 104 then obtains the delay value, for example by extracting it, from the PBCH or ePBCH.

When delay scheduling is used for both MTC devices and non-MTC devices, there may be two or more delay values. For example, MTC devices use one fixed delay value to receive the system information block 1 (SIB1) message. Non-MTC devices receive both the DCI message and the SIB1 on subframe 5, while MTC devices cannot receive the DCI and SIB1 in the same subframe. The MTC device then receives another delay value after processing the SIB1 message. The second delay value may be configured by the network, and may override the first value. For example, the first delay indicates that the SIB1 message is transmitted in subframe 5. However, the corresponding DCI message (carried in either the PDCCH or ePDCCH for the SIB1 message) is transmitted at a fixed earlier delay, such as in subframe 3. In another example, the PDCCH or ePDCCH for the SIB1 message is transmitted in subframe 5, while the SIB1 message for the MTC device is transmitted in a later subframe.

In one embodiment, the delay value may be signaled by the DCI message. There can be a field in the DCI message to indicate which subframe is or subframes are scheduled for the device to transmit data on for uplink or to receive data on for downlink. In one example, the DCI message has one value when scheduling SIB messages on the PDSCH and another value when scheduling other information on the PDSCH. In this example, non-MTC devices may use an offset for the common messages when a single SIB message is used. For backwards compatibility, the DCI message may not have a delay field for non-MTC devices.

Delay scheduling may also be used in TDD. However, in TDD, because there may be uplink subframes interspersed between downlink subframes, some uplink subframes may be skipped over before transmitting the PDSCH in a downlink subframe using delay scheduling. Because communications controller 102 has no knowledge of the UE device type until the random access channel (RACH) process, communications controller 102 assumes that both MTC devices and non-MTC devices exist in the cell. In one example, communications controller 102 transmits a single DCI scrambled by system information radio network system information (SI-RNTI), paging RNTI (P-RNTI), or random access response RNTI (RAR-RNTI). However, communications controller 102 transmits two PDSCH in different subframes based on the single DCI. UE 104 knows how to interpret the delay of the PDSCH based on its capability (such as a category 1, category 2, and possibly category 0 device), and the subframe in which the DCI was received. All fields in the DCI messages are common for these two PDSCH. For non-MTC devices, the PDSCH is received on the same subframe as the PDCCH or ePDCCH with an implicit delay of zero. For MTC devices, there is a delay between receiving the PDCCH or ePDCCH and the PDSCH.

In another embodiment, two DCI messages are used to schedule a common broadcast PDSCH (e.g. SIB1). One DCI message is used for non-MTC devices, and the other DCI message is used for MTC devices.

In an embodiment, common messages are transmitted in known PRBs with fixed MCS and locations. Thus, no delay is needed. This information may be conveyed in other RRC messages.

Figure 10:
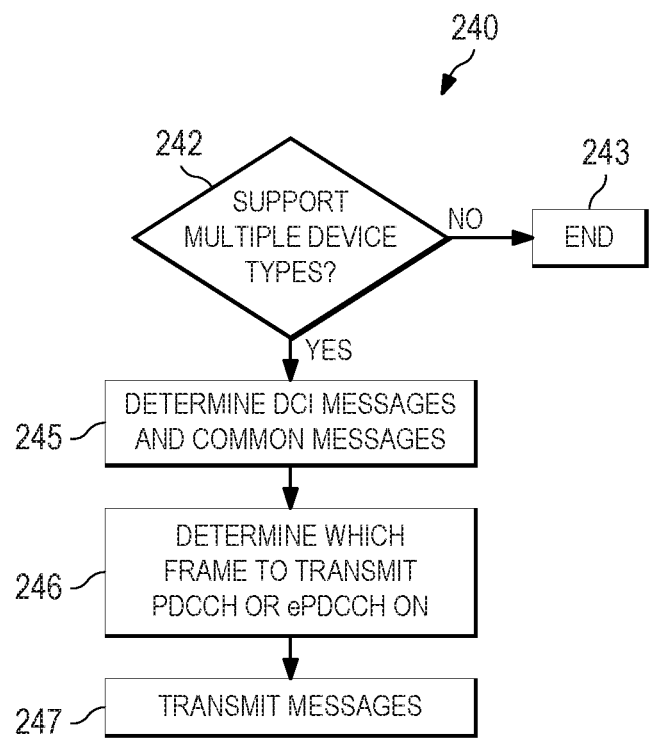
FIG. 10 illustrates an embodiment method of transmitting common messages.

FIG. 10 illustrates flowchart 240 for a method of transmitting common messages by communications controller 102. Initially, in step 242, communications controller 102 determines whether it supports multiple types of devices. For example, communications controller 102 may support both MTC devices and non-MTC devices. In one example, communications controller 102 is required to support multiple types of device. When communications controller 102 does not support multiple types of devices, the method goes to step 243 and ends.

When communications controller 102 supports multiple types of devices, whether duplicate or separate common messages will be transmitted to different device types may be specified, for example in a standard. For example, MTC devices and non-MTC devices may not be capable of receiving common messages in the same subframe. Examples of common messages include system information (SI), paging, and RAR messages. When communications controller 102 supports multiple types of devices, it may encapsulate separate common messages for different device types. On the other hand, communications controller 102 may duplicate the same common message for the different types of devices.

Next, in step 245, communications controller 102 determines the DCI messages and the contents for the common messages. When one DCI message is used for the common messages, communications controller 102 may transmit duplicate or separate common messages in different subframes. In one example, the same message is duplicated and transmitted in different subframes. In another example, separate messages are transmitted. One message is targeted at non-MTC devices in the same subframe as the DCI, and a similar message, possibly with slightly different parameters or fields, is targeted at MTC devices in a future subframe. On the other hand, when two DCI messages are used, one for each type of device, the DCI messages are separately scrambled. For example, the DCI message for non-MTC devices is scrambled by SI-RNTI, P-RNTI, or RAR-RNTI. On the other hand, the DCI message for MTC devices can be scrambled by new RNTIs, such as multicast channel (MCH) scheduling information RNTI (MSI-RNTI), multiple P-RNTI (MP-RNTI), or multiple RAR RNTI (MRAR-RNTI). In scrambling the DCI messages, the cyclic redundancy check (CRC) code is computed to produce a parity sequence. Then, the parity sequence is added to the RNTI value using a bitwise exclusive-or operation. Finally, this value is appended to the original DCI message. An example of a modulated DCI is a DCI message that is scrambled, encoded, interleaved, rate matched, and mapped in a sequence of constellation points, such as quadrature phase shift keying (QPSK) points. In another embodiment, the DCI message length is different for MTC devices and non-MTC devices. For example, a DCI format 1A message may be 27 bits for non-MTC devices, but 31 bits for MTC devices. The difference in size of the messages can be due to a field representing the delay value. In this example, the same scrambling value is used for both messages. In an example, communications controller 102 also decides whether to transmit the DCI message within the PDCCH or the ePDCCH. Communications controller 102 may determine which resources to place the modulated DCI message on or determine the type of DCI message to transmit. Additionally, communications controller 102 may determine which PRB pair(s) to transmit the PDSCH on.

After determining the DCI messages, communications controller 102, in step 246, determines which subframe to transmit the PDCCH or ePDCCH on for the common message or messages. For example, when a SIB1 message is used, the SIB1 is transmitted on subframe 5. The PDCCH or ePDCCH is also transmitted in subframe 5 for non-MTC devices, with no delay (an implicit delay value of 0). On the other hand, for MTC devices, the PDCCH or ePDCCH is transmitted earlier with a time advance. For example, the PDCCH or ePDCCH is transmitted on subframe 3. Alternatively, the PDCCH or ePDCCH is also transmitted on subframe 5 for MTC devices, and the duplicated SIB1 or separate SIB1 is transmitted in a later subframe for MTC devices.

Finally, in step 247, communications controller 102 transmits the common messages to UE 104. This is done in accordance with the subframe conveying the PDCCH or ePDCCH.

Figure 11:
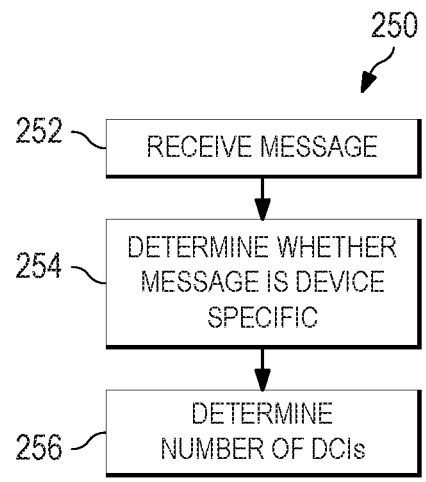
FIG. 11 illustrates an embodiment method of receiving common messages.
Figure 12:
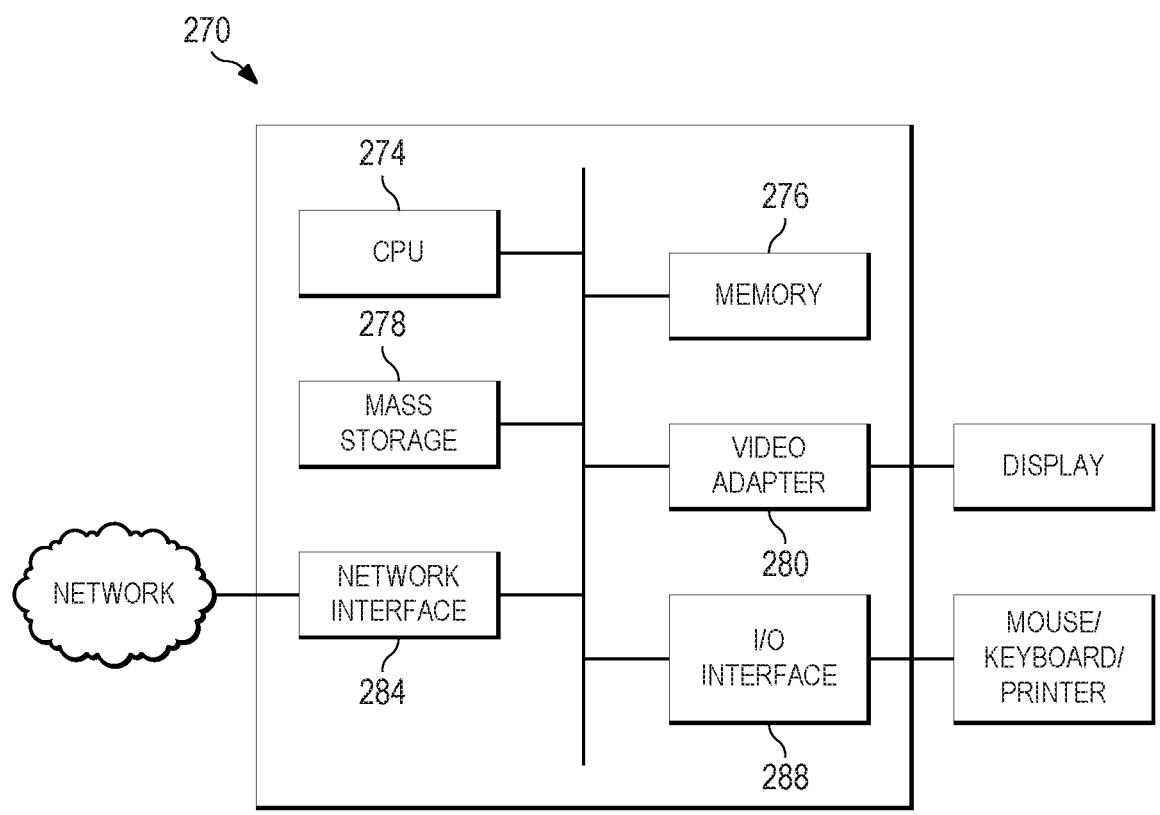
FIG. 12 illustrates a block diagram of an embodiment of a general-purpose computer system.

FIG. 11 illustrates flowchart 250 for a method of receiving common messages by UE 104 when multiple types of devices coexist in a cell. UE 104 may be an MTC device or a non-MTC device. Initially, in step 252, UE 104 receives a common message from communications controller 102.

After receiving the common message, UE 104 determines whether the message is a common message specific to the device type of UE 104 or a common message shared with other device types, in step 254. In one example, whether common messages are device specific or shared is a system configuration, which for example is transmitted on the PBCH.

Then, in step 256, UE 104 determines the number of DCI messages transmitted on the common search space. There may be zero, one, or more DCI messages transmitted on the common search space. When there is a DCI message, different device types may interpret the DCI message differently. For example, the resource assignment (RA) field in the DCI is distributed for non-MTC devices but concentrated for MTC devices. When there are two DCI messages, non-MTC devices may receive one DCI message scrambled by SI-RNTI, P-RNTI, or RAR-RNTI, while MTC devices receive the other DCI message scrambled with new RNTIs, such as MSI-RNTI, MP-RNTI, or MRAR-RNTI.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    transmitting, by a base station to a user equipment (UE), a first downlink control information (DCI) message in a first set of symbols of a first subframe, the first DCI message comprising information scheduling a transmission of a first information, and the first DCI message comprising information of a delay between the first set of symbols of the first subframe and a second set of symbols of a scheduled subframe; and
    transmitting, by the base station to the UE, the first information in the second set of symbols of the scheduled subframe in accordance with at least one of the delay and the first DCI message.

2. The method of claim 1, wherein the scheduled subframe is same as the first subframe.

3. The method of claim 1, wherein the scheduled subframe is different than the first subframe.

4. The method of claim 1, wherein the delay comprises a time interval corresponding to multiple slots.

5. The method of claim 1, wherein the information of the delay comprises an index of a table including a plurality of delay values.

6. The method of claim 5, wherein the table comprises a delay value of zero.

7. The method of claim 5, further comprising:
transmitting, by the base station to the UE, information of the table by higher layer signaling.

8. The method of claim 1, wherein the first information is transmitted in a physical downlink shared channel (PDSCH).

9. The method of claim 1, wherein a starting symbol of the second set of symbols for transmitting the first information is signaled by higher layer signaling.

10. The method of claim 1, wherein the first DCI message comprises a field including the information of the delay.

11. A method comprising:
receiving, by a user equipment (UE) from a base station, a downlink control information (DCI) message in a first set of symbols of a first subframe, the DCI message comprising scheduling information for transmission of a first information;
obtaining, by the UE, information of a delay between the first set of symbols of the first subframe and a second set of symbols of a scheduled subframe; and
receiving, by the UE from the base station, the first information in the second set of symbols of the scheduled subframe in accordance with at least one of the delay and the DCI message.

12. The method of claim 11, wherein the scheduled subframe is same as the first subframe.

13. The method of claim 11, wherein the scheduled subframe is different than the first subframe.

14. The method of claim 11, wherein the delay comprises a time interval corresponding to multiple slots.

15. The method of claim 11, wherein the information of the delay comprises an index of a table including a plurality of delay values.

16. The method of claim 15, wherein the table comprises a delay value of zero.

17. The method of claim 15, further comprising:
receiving, by the UE, information of the table in higher layer signaling.

18. The method of claim 11, wherein the first information is received in a physical downlink shared channel (PDSCH).

19. The method of claim 11, wherein obtaining the information of the delay comprises obtaining the information of the delay from the DCI message.

20. The method of claim 11, wherein the DCI message comprises a field including the information of the delay.

21. A base station comprising:
a non-transitory memory storage comprising instructions; and
one or more processors in communication with the memory storage, wherein the one or more processors execute the instructions to:
transmit a first downlink control information (DCI) message in a first set of symbols of a first subframe, the first DCI message comprising scheduling information for transmission of a first information, and the first DCI message comprising information of a delay between the first set of symbols of the first subframe and a second set of symbols of a scheduled subframe; and
transmit the first information in the second set of symbols of the scheduled subframe in accordance with at least one of the delay and the first DCI message.

22. The base station of claim 21, wherein the first information is transmitted in a physical downlink shared channel (PDSCH).

23. A user equipment (UE) comprising:
a non-transitory memory storage comprising instructions; and
one or more processors in communication with the memory storage, wherein the one or more processors execute the instructions to:
receive a downlink control information (DCI) message in a first set of symbols of a first subframe, the DCI message comprising scheduling information for transmission of a first information;
obtain information of a delay between the first set of symbols of the first subframe and a second set of symbols of a scheduled subframe; and
receive the first information in the second set of symbols of the scheduled subframe in accordance with at least one of the delay and the DCI message.

24. The UE of claim 23, wherein the information of the delay is obtained from the DCI message.

* * * * *